United States Patent
Fujihara

(10) Patent No.: US 11,264,608 B2
(45) Date of Patent: Mar. 1, 2022

(54) POSITIVE ELECTRODE ACTIVE MATERIAL FOR NON-AQUEOUS ELECTROLYTE SECONDARY BATTERY

(71) Applicant: NICHIA CORPORATION, Anan (JP)

(72) Inventor: Keisuke Fujihara, Tokushima (JP)

(73) Assignee: NICHIA CORPORATION, Anan (JP)

( * ) Notice: Subject to any disclaimer, the term of this patent is extended or adjusted under 35 U.S.C. 154(b) by 216 days.

(21) Appl. No.: 16/451,979

(22) Filed: Jun. 25, 2019

(65) Prior Publication Data

US 2019/0393484 A1    Dec. 26, 2019

(30) Foreign Application Priority Data

Jun. 26, 2018 (JP) .............................. JP2018-121076

(51) Int. Cl.

| | |
|---|---|
| *H01M 4/13* | (2010.01) |
| *H01M 4/36* | (2006.01) |
| *C01G 53/00* | (2006.01) |
| *C01G 33/00* | (2006.01) |
| *H01M 10/0525* | (2010.01) |
| *H01M 4/131* | (2010.01) |
| *H01M 4/505* | (2010.01) |
| *H01M 4/525* | (2010.01) |
| *H01M 4/485* | (2010.01) |
| *H01M 4/1391* | (2010.01) |
| *H01M 4/02* | (2006.01) |

(52) U.S. Cl.
CPC ............ *H01M 4/364* (2013.01); *C01G 33/00* (2013.01); *C01G 53/42* (2013.01); *H01M 4/131* (2013.01); *H01M 4/1391* (2013.01); *H01M 4/366* (2013.01); *H01M 4/485* (2013.01); *H01M 4/505* (2013.01); *H01M 4/525* (2013.01); *H01M 10/0525* (2013.01); *C01P 2004/61* (2013.01); *H01M 2004/028* (2013.01)

(58) Field of Classification Search
CPC ...... H01M 4/364; H01M 4/362; H01M 4/131; H01M 4/1391; H01M 4/366; H01M 4/485; H01M 4/48; H01M 4/505; H01M 4/50; H01M 4/525; H01M 4/52; H01M 10/0525; H01M 10/052; H01M 2004/028; C01G 53/42; C01G 53/44; C01G 53/50; C01G 53/006; C01G 33/00; C01G 23/00; C01G 23/003; C01P 2004/61; C01P 2004/80
See application file for complete search history.

(56) References Cited

U.S. PATENT DOCUMENTS

| | | | |
|---|---|---|---|
| 2012/0135315 A1 | 5/2012 | Niina et al. | |
| 2012/0270107 A1 | 10/2012 | Toya et al. | |
| 2013/0260248 A1 | 10/2013 | Seki et al. | |
| 2015/0194673 A1 | 7/2015 | Takagi et al. | |
| 2016/0293952 A1* | 10/2016 | Kaneda | H01M 4/485 |
| 2018/0233739 A1 | 8/2018 | Park et al. | |
| 2019/0115596 A1 | 4/2019 | Kajiyama et al. | |

FOREIGN PATENT DOCUMENTS

| | | | | |
|---|---|---|---|---|
| JP | 2002075367 A | 3/2002 | | |
| JP | 2002216763 A | 8/2002 | | |
| JP | 2003-308880 | * 10/2003 | ............ | H01M 10/40 |
| JP | 2003292322 A | 10/2003 | | |
| JP | 2003308880 A | 10/2003 | | |
| JP | 2006012433 A | 1/2006 | | |
| JP | 2011-116580 A | 6/2011 | | |
| JP | 2011146390 A | 7/2011 | | |
| JP | 2013206552 A | 10/2013 | | |
| JP | 2015122298 A | 7/2015 | | |
| JP | 2017188428 A | 10/2017 | | |
| WO | 2011/016553 A1 | 2/2011 | | |
| WO | 2014/034430 A1 | 3/2014 | | |
| WO | 2017095152 A1 | 6/2017 | | |

* cited by examiner

*Primary Examiner* — Raymond Alejandro
(74) *Attorney, Agent, or Firm* — Hunton Andrews Kurth LLP

(57) ABSTRACT

A positive electrode active material for a non-aqueous electrolyte secondary battery is provided. The positive electrode active material includes a layer-structured, nickel-containing lithium transition metal complex oxide. The lithium transition metal complex oxide contains titanium and niobium in a chemical composition thereof, and has a ratio of a total number of moles of titanium and niobium relative to a total number of moles of metals excluding lithium in the chemical composition of 0.04 or less.

21 Claims, No Drawings

POSITIVE ELECTRODE ACTIVE MATERIAL FOR NON-AQUEOUS ELECTROLYTE SECONDARY BATTERY

CROSS-REFERENCE TO RELATED APPLICATIONS

This application claims priority to Japanese Patent Application No. 2018-121076, filed on Jun. 26, 2018, the disclosure of which is hereby incorporated by reference in their entirety.

BACKGROUND

Field of the Invention

The present disclosure relates to a positive electrode active material for a non-aqueous electrolyte secondary battery.

Description of the Related Art

Lithium transition metal complex oxides having a layered structure, such as lithium cobalt oxide and lithium nickel oxide, have a working voltage as high as 4 V and a large capacitance when used in a battery, and thus are widely used as a power source in electronic devices, such as cellular phones, notebook personal computers, and digital cameras, or as an automotive battery. Electronic devices and automotive batteries are increasingly sophisticated. Thus, such a power source needs to have improved safety in addition to further improved capacitance and charge and discharge cycle characteristics.

For example, Japanese Patent Application Publication No. 2015-122298 describes a lithium transition metal complex oxide containing niobium as well as nickel and cobalt in the chemical composition, and having improved safety, higher capacitance, and improved cycle characteristics according to the description. Japanese Patent Application Publication No. 2002-216763 describes a positive electrode active material containing cobalt, titanium, and halogen elements in the chemical composition, and having improved battery characteristics with less gas generation. International Patent Publication No. WO 2011/016553 describes a positive electrode active material containing a lithium-containing transition metal complex oxide having a niobium-containing substance and a titanium-containing substance on the surface, and a battery containing the positive electrode active material has improved output characteristics according to the description.

SUMMARY

A first aspect is directed to a positive electrode active material containing a layer-structured, nickel-containing lithium transition metal complex oxide for a non-aqueous electrolyte secondary battery. The lithium transition metal complex oxide contains titanium and niobium in the chemical composition, and the ratio of the total number of moles of titanium and niobium relative to the total number of moles of metals excluding lithium is 0.04 or less.

A second aspect is directed to a non-aqueous electrolyte secondary battery including a positive electrode containing the positive electrode active material. A third aspect is directed to a method of producing a positive electrode active material for a non-aqueous electrolyte secondary battery. The method includes preparing a raw material mixture containing a nickel-containing compound, a lithium-containing compound, a titanium-containing compound, and a niobium-containing compound, and heat-treating the raw material mixture.

DETAILED DESCRIPTION

Some embodiments of the present invention will now be described in detail. The embodiments described below are mere examples of the positive electrode active material and others for a non-aqueous electrolyte secondary battery for embodying the technical concept of the present invention, and the present invention is not limited to the positive electrode active material and others for a non-aqueous electrolyte secondary battery described below. As used herein, the term "step" means not only an independent step but also a step which cannot be clearly distinguished from the other steps but that can achieve the desired object. For the amount of each component contained in a composition, when a plurality of substances corresponding to the component are present in the composition, the amount of the component means the total amount of the corresponding substances present in the composition unless otherwise specified.

Positive Electrode Active Material

The positive electrode active material for a non-aqueous electrolyte secondary battery contains a layer-structured, nickel-containing lithium transition metal complex oxide. The lithium transition metal complex oxide contains titanium and niobium in the chemical composition, and the ratio of the total number of moles of titanium and niobium relative to the total number of moles of metals excluding lithium is 0.04 or less. A secondary battery including the positive electrode active material containing a lithium transition metal complex oxide that contains both titanium and niobium in the specific molar ratio in the chemical composition emits less gas generated by desorption of an oxygen component from the lithium transition metal complex oxide when the battery is charged at a high voltage, and thus may be superior in safety. A lithium transition metal complex oxide containing either titanium or niobium has a more stable crystal structure because both titanium and niobium have an affinity for oxygen in the lithium transition metal complex oxide. In a lithium transition metal complex oxide containing both titanium and niobium as in the present embodiment, for example, lithium in the lithium titanate and lithium niobate formed in the unit lattice is believed to serve as a pillar in the lithium layer, contributing to a more stable crystal structure. Thus, a battery including a positive electrode active material containing the lithium transition metal complex oxide of the present embodiment emits less gas from the lithium transition metal complex oxide even when heat is generated in the battery, and is highly safe.

The safety of a non-aqueous electrolyte secondary battery as used herein can be evaluated through a thermal analysis of a charged positive electrode active material. Specifically, the evaluation is performed by analyzing the amount of oxygen gas desorbed from the positive electrode active material using the temperature programmed desorption (TPD) method. In the TPD method, a positive electrode active material, or a sample, is heated under controlled conditions, and a gas desorbed from the sample is analyzed. The analysis can be carried out using, for example, a TPD gas photoionization mass spectrometry (TPD type R by Rigaku). A high voltage as used herein refers to charging a positive electrode active material containing a layer-structured, nickel-containing lithium transition metal complex oxide at a voltage of 4.3 V or more, and preferably 4.5 V or more.

In the positive electrode active material containing both titanium and niobium in a specific ratio in the chemical composition, the amount of oxygen gas desorbed is, for example, 75% or less, preferably 60% or less, and more preferably 45% or less relative to the amount of oxygen gas (100%) desorbed from a positive electrode active material containing neither titanium nor niobium in the chemical composition, both measured by a TPD gas analyzer at around 300° C. The lower limit of the amount of desorbed oxygen gas is, for example, 20% or more.

The lithium transition metal complex oxide contains titanium and niobium in the chemical composition. Containing titanium and niobium in the chemical composition does not mean that titanium and niobium are locally present, for example, on the surface of the lithium transition metal complex oxide, but titanium and niobium are completely mixed with elements forming the lithium transition metal complex oxide.

The lithium transition metal complex oxide included in the positive electrode active material contains at least nickel (Ni), titanium (Ti), and niobium (Nb), and further preferably contains at least cobalt (Co). Also, the lithium transition metal complex oxide preferably further contains at least one of aluminum (Al) and manganese (Mn) (hereinafter referred to as a first metal element). Also, the lithium transition metal complex oxide preferably further contains at least one of magnesium (Mg), zirconium (Zr), tungsten (W), tantalum (Ta), and molybdenum (Mo) (hereinafter referred to as a second metal element).

In the lithium transition metal complex oxide, the ratio of the number of moles of nickel relative to the total number of moles of metals excluding lithium is, for example, 0.3 or more, preferably 0.4 or more, and more preferably 0.45 or more, and the upper limit is, for example, less than 1, preferably 0.95 or less, more preferably 0.9 or less, and still more preferably 0.6 or less. When nickel is contained within the range of the molar ratio above, a non-aqueous electrolyte secondary battery containing the lithium transition metal complex oxide may achieve both high electric charge and discharge capacitance at a high voltage and superior cycle characteristics.

When the lithium transition metal complex oxide contains cobalt, the ratio of the number of moles of cobalt relative to the total number of moles of metals excluding lithium is, for example, 0.05 or more, preferably 0.1 or more, and more preferably 0.15 or more, and the upper limit is, for example, less than 1, preferably 0.45 or less, more preferably 0.4 or less, and still more preferably 0.3 or less. When cobalt is contained within the range of the molar ratio above, a non-aqueous electrolyte secondary battery containing the lithium transition metal complex oxide may achieve sufficient electric charge and discharge capacitance at a high voltage.

In the lithium transition metal complex oxide, the ratio of the number of moles of titanium relative to the total number of moles of metals excluding lithium is, for example, 0.001 or more, preferably 0.003 or more, more preferably 0.007 or more, and still more preferably 0.045 or more, and the upper limit is, for example, 0.02 or less, preferably 0.015 or less, more preferably 0.013 or less, still more preferably 0.012 or less, and yet more preferably 0.011 or less. When titanium is contained within the range of the molar ratio above, the safety of the non-aqueous electrolyte secondary battery may be further improved.

In the lithium transition metal complex oxide, the ratio of the number of moles of niobium relative to the total number of moles of metals excluding lithium is, for example, 0.001 or more, preferably 0.0015 or more, more preferably 0.002 or more, and still more preferably 0.004 or more, and the upper limit is, for example, 0.02 or less, preferably 0.015 or less, more preferably 0.013 or less, and still more preferably 0.008 or less. When niobium is contained within the range of the molar ratio above, the safety of the non-aqueous electrolyte secondary battery may be further improved.

In the lithium transition metal complex oxide, the ratio of the total number of moles of titanium and niobium (the sum of the molar ratios of titanium and niobium) relative to the total number of moles of metals excluding lithium is, for example, 0.04 or less, preferably 0.03 or less, more preferably 0.02 or less, and still more preferably 0.016 or less, and the lower limit is, for example, 0.004 or more, and preferably 0.009 or more. When the ratio of the total number of moles of titanium and niobium relative to the total number of moles of metals excluding lithium is within the above range, the amount of oxygen gas desorption determined by TPD is further reduced, and the safety of the non-aqueous electrolyte secondary battery may be further improved.

In the lithium transition metal complex oxide, the ratio of the number of moles of titanium relative to the total number of moles of titanium and niobium is, for example, 0.05 or more, preferably 0.1 or more, more preferably 0.3 or more, still more preferably 0.5 or more, and the upper limit is, for example, 0.95 or less, preferably 0.9 or less, more preferably 0.8 or less, and still more preferably 0.7 or less. When the molar ratio of titanium is within the above range, the amount of oxygen gas desorption determined by TPD is further reduced, and the safety of the non-aqueous electrolyte secondary battery may be further improved.

The lithium transition metal complex oxide preferably contains at least one of aluminum and manganese, or the first metal element, and more preferably contains at least manganese. When the lithium transition metal complex oxide contains the first metal element, the ratio of the number of moles of the first metal element relative to the total number of moles of metals excluding lithium is, for example, 0.05 or more, preferably 0.1 or more, and more preferably 0.2 or more, and the upper limit is, for example, 0.45 or less, and preferably 0.4 or less. When the first metal element is contained in a ratio within the above range, the non-aqueous electrolyte secondary battery may achieve both sufficient electric charge and discharge capacitance, and improved safety.

The lithium transition metal complex oxide preferably further contains the second metal element that is at least one selected from the group consisting of magnesium, zirconium, tungsten, tantalum, and molybdenum. When the lithium transition metal complex oxide contains the second metal element, the ratio of the number of moles of the second metal element relative to the total number of moles of metals excluding lithium is, for example, 0.001 or more, and preferably 0.002 or more, and the upper limit is, for example, 0.05 or less, and preferably 0.02 or less.

In the lithium transition metal complex oxide, the ratio of the number of moles of lithium relative to the total number of moles of metals excluding lithium is, for example, 0.95 or more, and preferably 0.98 or more, and the upper limit is, for example, 1.5 or less, and preferably 1.25 or less.

When the lithium transition metal complex oxide contains cobalt and the first metal element in addition to nickel, the molar ratio of nickel, cobalt, and the first metal element is, for example, nickel:cobalt:the first metal element=(0.4 to 0.95):(0.1 to 0.4):(0.1 to 0.4), and preferably (0.45 to 0.6): (0.1 to 0.3):(0.2 to 0.4).

The lithium transition metal complex oxide may have a chemical composition represented by, for example, the formula below.

$$Li_aNi_xCo_yM^1_zM^2_wTi_uNb_vO_2$$

In the formula, a, x, y, z, w, u, and v satisfy $0.95 \le a \le 1.5$, $0.3 \le x < 1$, $0 \le y < 1$, $0 \le z \le 0.45$, $0 \le w \le 0.05$, $0 < u \le 0.02$, $0 < v \le 0.02$, $x+y+z+w+u+v \le 1$, and $0 < u+v \le 0.04$; $M^1$ contains at least one of Al and Mn, and preferably contains at least Mn; and $M^2$ is at least one selected from the group consisting of Mg, Zr, W, Ta, and Mo. In certain embodiments, $M^1$ is at least one of Al and Mn, preferably is Mn or is Mn and Al.

In the formula, x satisfies, for example, $0.3 \le x < 1$, preferably $0.4 \le x \le 0.95$, more preferably $0.45 \le x \le 0.9$, and still more preferably $0.45 \le x \le 0.6$. y satisfies, for example, $0 \le y < 1$, preferably $0.05 \le y \le 0.45$, more preferably $0.1 \le y \le 0.4$, and still more preferably $0.1 \le y \le 0.3$. z satisfies, for example, $0 \le z \le 0.45$, preferably $0.05 \le z \le 0.45$, and more preferably $0.1 \le z \le 0.4$. w satisfies, for example, $0 \le w \le 0.05$, preferably $0.001 \le w \le 0.05$, and more preferably $0.002 \le w \le 0.02$. u satisfies, for example, $0 < u \le 0.02$, preferably $0.001 \le u \le 0.013$, and more preferably $0.007 \le u \le 0.011$. v satisfies, for example, $0 < v \le 0.02$, preferably $0.001 \le v \le 0.013$, and more preferably $0.004 \le u \le 0.008$. x, y, z, w, u, and v satisfy, for example, $x+y+z+w+u+v \le 1$.

The lithium transition metal complex oxide has a center particle size of, for example, 1 μm to 50 μm, and preferably 3 μm to 30 μm. A center particle size is a value where the volume accumulation from the small particle size side is 50% in a volume distribution obtained by the laser scattering method.

Method for Producing Positive Electrode Active Material

The positive electrode active material is produced, for example, by the production method described below. The method for producing the positive electrode active material includes a mixing step of mixing a nickel-containing compound, a lithium-containing compound, a titanium-containing compound, and a niobium compound to prepare a raw material mixture, and a heat-treating step of heat-treating the raw material mixture. A non-aqueous electrolyte secondary battery containing the resulting lithium transition metal complex oxide may be superior in safety in electric charge and discharge at a higher voltage.

Examples of the metal element-containing compounds to be used as a raw material include metal element-containing oxides, hydroxides, nitrates, sulfates, and carbonates. The raw material mixture may further contain, for example, a cobalt-containing compound and a manganese-containing compound as necessary in addition to a nickel-containing compound, a lithium-containing compound, a titanium-containing compound, and a niobium-containing compound. Also, the raw material mixture may be prepared by preparing a complex hydroxide, a complex carbonate, and/or a complex oxide containing, for example, cobalt or manganese in addition to nickel as a nickel-containing compound, and then mixing the nickel-containing compound with a lithium-containing compound, a titanium-containing compound, a niobium-containing compound, and others. The mixing ratios of these metal element-containing compounds in the raw material mixture may be selected in accordance with the target lithium transition metal complex oxide.

Examples of the lithium-containing compound include lithium carbonate, lithium nitrate, and lithium hydroxide. Examples of the nickel-containing compound include nickel carbonate, nickel sulfate, nickel hydroxide, nickel oxide, and nickel peroxide. Examples of the titanium-containing compound include titanium oxide. Examples of the niobium compound include niobium oxide. Examples of the cobalt compound include cobalt oxide, dicobalt trioxide, tricobalt tetraoxide, cobalt hydroxide, cobalt nitrate, and cobalt sulfate. Examples of the manganese-containing compound include manganese dioxide, dimanganese trioxide, trimanganese tetraoxide, manganese carbonate, manganese nitrate, and manganese sulfate.

When a complex compound containing, for example, cobalt and manganese in addition to nickel is used as the nickel-containing compound, the raw material may be prepared by adding, for example, an appropriate precipitator to a solution in which, for example, a nickel-containing compound, a cobalt-containing compound, and a manganese-containing compound are dissolved to obtain, for example, a complex carbonate or a complex hydroxide containing nickel, cobalt, and manganese. For the details of the preparation method of such a complex compound by a coprecipitation method, refer to, for example, Japanese Patent Application Publications No. 2003-292322 and No. 2011-116580 which are incorporated herein by reference in their entirety.

Specifically, for example, a nickel-containing compound, a manganese-containing compound, and a cobalt-containing compound are mixed in a manner to obtain an aqueous solution containing cobalt ions, nickel ions, and manganese ions in a predetermined composition ratio, and the aqueous solution is then added dropwise into pure water with stirring to obtain an aqueous solution. The temperature of the resulting aqueous solution is increased to 40 to 80° C., and an alkaline solution is added dropwise to the aqueous solution to adjust the pH of the aqueous solution to from 8 to 11. This produces a precipitate containing cobalt, nickel, and manganese. Examples of the alkaline solution include an aqueous solution of sodium hydroxide, an aqueous solution of ammonium hydrogen carbonate, an aqueous solution of sodium hydrogen carbonate, an aqueous solution of potassium hydroxide, and an aqueous solution of lithium hydroxide.

The precipitate is then filtered off, and the filtered precipitate is washed with water, and heat-treated to obtain a complex oxide containing cobalt, nickel, and manganese in a desired molar ratio. Into the resulting complex oxide, a lithium-containing compound, a titanium-containing compound, and a niobium-containing compound are mixed in a desired molar ratio to obtain a raw material mixture. Titanium and niobium may be added any time before the subsequent heat treatment. For example, in preparing a precipitate, an aqueous solution containing at least one of a titanium-containing compound and a niobium-containing compound may be used so that the precipitate contains at least one of titanium and niobium.

In the heat-treating step, the raw material mixture prepared in the mixing step is heat-treated to obtain a lithium transition metal complex oxide. The heat-treating temperature is, for example, from 750° C. to 1100° C. Heat-treating at a temperature of 750° C. or more can substantially prevent the raw material from remaining partially unreacted. Also, heat-treating at a temperature of 1100° C. or less can reduce generation of by-products. The duration of the heat-treating is, for example, from 5 to 30 hours. The duration of heat-treating within this range allows the dispersion reaction between the mixture particles to fully proceed, and the productivity is high. The heat-treating may be carried out, for example, in an air atmosphere, an oxygen gas atmosphere, a mixed gas atmosphere containing oxygen gas and an inert gas, such as nitrogen gas and argon gas, an atmosphere with controlled oxygen concentration (partial pressure of oxygen), and a weakly oxidizing atmosphere.

The heat-treated product having undergone the heat-treating step may be pulverized using a stone mortar, a ball mill, a vibrational mil, a pin mill, or a jet mill as appropriate to obtain a powder with a target particle size.

Positive Electrode for Non-Aqueous Electrolyte Secondary Battery

A positive electrode for a non-aqueous electrolyte secondary battery includes a current collector, and a positive electrode active material layer containing the positive electrode active material for a non-aqueous electrolyte secondary battery arranged on the current collector. The non-aqueous electrolyte secondary battery containing the positive electrode is superior in safety in electric charge and discharge at a higher voltage.

Examples of the material for the current collector include aluminum, nickel, and stainless steel. The positive electrode active material layer can be formed by mixing the positive electrode active material, a conductive material, a binder, and others with a solvent to prepare a positive electrode mixture, applying the positive electrode mixture on the current collector, and subjecting the mixture on the current collector to, for example, drying and pressurizing treatment. Examples of the conductive material include natural graphite, artificial graphite, and acetylene black. Examples of the binder include polyvinylidene fluoride, polytetrafluoroethylene, and polyamide acryl resin.

Non-Aqueous Electrolyte Secondary Battery

The non-aqueous electrolyte secondary battery includes the positive electrode for a non-aqueous electrolyte secondary battery. The non-aqueous electrolyte secondary battery includes a negative electrode for a non-aqueous secondary battery, a non-aqueous electrolyte, and a separator in addition to the positive electrode for a non-aqueous electrolyte secondary battery. The negative electrode, the non-aqueous electrolyte, and the separator, and others to be used in the non-aqueous electrolyte secondary battery may be selected from those described in, for example, Japanese Patent Application Publications No. 2002-075367, No. 2011-146390, and No. 2006-12433 (incorporated herein by reference in their entirety) for use in a non-aqueous electrolyte secondary battery as appropriate.

EXAMPLES

Examples according to the present invention will now be specifically described below, but the present invention is not limited to these Examples. The center particle size of a lithium transition metal complex oxide is a value where the volume accumulation from the small particle size side is 50% in a volume distribution obtained by the laser scattering method. Specifically, the center particle diameter was measured using a laser diffraction particle size distribution analyzer (LD-3100 by Shimadzu).

Example 1

A complex hydroxide having a composition represented by $(Ni_{0.5}Co_{0.2}Mn_{0.3})(OH)_x$ (x=2 to 3) was obtained using a coprecipitation method. The resultant complex hydroxide, lithium carbonate, titanium oxide, and niobium oxide were mixed to have a molar ratio of Li:(Ni+Co+Mn):Ti:Nb=1.08: 0.985:0.0015:0.0135 to obtain a raw material mixture. The raw material mixture was heat-treated in atmosphere at 850° C. for 2.5 hours, and continuously at 920° C. for 8 hours to obtain a heat-treated product. The heat-treated product was pulverized, passed through a dry sieve to obtain a lithium transition metal complex oxide E1 having a composition represented by the formula below, and a center particle size of 17 μm.

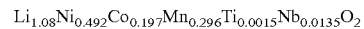
$Li_{1.08}Ni_{0.492}Co_{0.197}Mn_{0.296}Ti_{0.0015}Nb_{0.0135}O_2$

Example 2

A lithium transition metal complex oxide E2 having a composition represented by the formula below and a center particle size of 17 μm was obtained in the same manner as in Example 1 except that the raw materials were mixed to have a molar ratio of Li:(Ni+Co+Mn):Ti:Nb=1.08:0.985: 0.0045:0.0105.

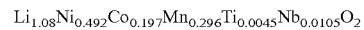
$Li_{1.08}Ni_{0.492}Co_{0.197}Mn_{0.296}Ti_{0.0045}Nb_{0.0105}O_2$

Example 3

A lithium transition metal complex oxide E3 having a composition represented by the formula below and a center particle size of 17 μm was obtained in the same manner as in Example 1 except that the raw materials were mixed to have a molar ratio of Li:(Ni+Co+Mn):Ti:Nb=1.08:0.985: 0.0075:0.0075.

$Li_{1.08}Ni_{0.492}Co_{0.197}Mn_{0.296}Ti_{0.0075}Nb_{0.0075}O_2$

Example 4

A lithium transition metal complex oxide E4 having a composition represented by the formula below and a center particle size of 17 μm was obtained in the same manner as in Example 1 except that the raw materials were mixed to have a molar ratio of Li:(Ni+Co+Mn):Ti:Nb=1.08:0.985: 0.0105:0.0045.

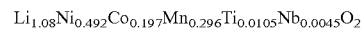
$Li_{1.08}Ni_{0.492}Co_{0.197}Mn_{0.296}Ti_{0.0105}Nb_{0.0045}O_2$

Example 5

A lithium transition metal complex oxide E5 having a composition represented by the formula below and a center particle size of 17 μm was obtained in the same manner as in Example 1 except that the raw materials were mixed to have a molar ratio of Li:(Ni+Co+Mn):Ti:Nb=1.08:0.985: 0.0135:0.0015.

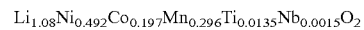
$Li_{1.08}Ni_{0.492}Co_{0.197}Mn_{0.296}Ti_{0.0135}Nb_{0.0015}O_2$

Example 6

A lithium transition metal complex oxide E6 having a composition represented by the formula below and a center particle size of 17 μm was obtained in the same manner as in Example 1 except that the raw materials were mixed to have a molar ratio of Li:(Ni+Co+Mn):Ti:Nb=1.08:0.995: 0.0025:0.0025.

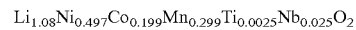
$Li_{1.08}Ni_{0.497}Co_{0.199}Mn_{0.299}Ti_{0.0025}Nb_{0.025}O_2$

Example 7

A lithium transition metal complex oxide E7 having a composition represented by the formula below and a center particle size of 17 μm was obtained in the same manner as in Example 1 except that the raw materials were mixed to have a molar ratio of Li:(Ni+Co+Mn):Ti:Nb=1.08:0.85:0.005:0.0005.

$$Li_{1.08}Ni_{0.495}Co_{0.98}Mn_{0.297}Ti_{0.005}Nb_{0.005}O_2$$

Comparative Example 1

A lithium transition metal complex oxide C1 having a composition represented by the formula below and a center particle size of 17 μm was obtained in the same manner as in Example 1 except that the raw materials were mixed to have a molar ratio of Li:(Ni+Co+Mn):Nb=1.08:0.985:0.015.

$$Li_{1.08}Ni_{0.492}Co_{0.197}Mn_{0.296}Nb_{0.015}O_2$$

Comparative Example 2

A lithium transition metal complex oxide C2 having a composition represented by the formula below and a center particle size of 17 μm was obtained in the same manner as in Example 1 except that the raw materials were mixed to have a molar ratio of Li:(Ni+Co+Mn):Ti=1.08:0.985:0.015.

$$Li_{1.08}Ni_{0.492}Co_{0.197}Mn_{0.296}Ti_{0.015}O_2$$

Comparative Example 3

A lithium transition metal complex oxide C3 having a composition represented by the formula below, and a center particle size of 17 μm was obtained in the same manner as in Example 1 except that neither titanium oxide nor niobium oxide were used.

$$Li_{1.08}Ni_{0.5}Co_{0.2}Mn_{0.3}O_2$$

Preparation of Batteries for Evaluation

Using the positive electrode active materials of Examples 1 to 7 and Comparative Examples 1 to 3, non-aqueous electrolyte secondary batteries for evaluation were produced in a manner described below.

Preparation of Positive Electrode Plate 92 parts by mass of each positive electrode active material, 3 parts by mass of acetylene black, and 5 parts by mass of polyvinylidene fluoride were dispersed in N-methylpyrrolidone to obtain a positive electrode slurry. The positive electrode slurry was applied onto an aluminum foil current collector, dried, cut into a predetermined size, and compression-molded using a press to have a positive electrode plate.

Preparation of Non-Aqueous Electrolyte

Ethylene carbonate and methyl ethyl carbonate were mixed in a volume ratio of 3:7 to have a mixed solvent. To the mixed solvent, lithium hexafluorophosphate was dissolved to have a concentration of 1.0 mol/L to obtain a non-aqueous electrolyte.

Fabrication of Non-Aqueous Electrolyte Secondary Battery

To each positive electrode plate, a lead electrode was attached, and then vacuum-dried at 110° C. Subsequently, each positive electrode plate was wrapped with a porous polyethylene separator, and the wrapped positive electrode plate was put into a laminated pouch pack, and was placed into an argon dry box. In the argon dry box, a metallic Li foil having been cut into a predetermined size was pasted to a leaded SUS plate to obtain a negative electrode plate. The negative electrode plate was put into a laminated pack on the wrapped positive electrode plate. To the pack, the non-aqueous electrolyte was injected, and the pack was sealed to obtain a laminated non-aqueous electrolyte secondary battery, or a single-pole cell, to be used as an evaluation battery.

For each of the resultant evaluation batteries, the battery characteristics as described below were evaluated.

Safety Evaluation

Using the batteries for evaluation, samples were prepared in a manner as described below, and the samples were subjected to temperature programmed desorption (TPD) gas analysis. First, the batteries for evaluation were subjected to three cycles of electric charge and discharge at 2.75 V to 4.5 V using an electric charge and discharge tester (TOSCAT-3100, by Toyo System). The batteries for evaluation were then subjected to constant-current constant-voltage charge (at 4.5 V) at a charge rate of 0.2 C at 25° C. for 15 hours. Each lithium ion secondary battery was then taken out from the electric charge and discharge tester, and disassembled within a globe box to remove the positive electrode. The positive electrode was partially cut into a sample with a mass of 5 mg.

For the resultant samples, the oxygen gas desorption amount was measured at a temperature in the range of from 200° C. to 600° C. using a temperature programmed desorption (TPD) gas photoionization mass spectrometry analyzer (TPD type R by Rigaku). Table 1 shows the relative peak height (%) of the peak appearing about 300° C. of each sample relative to the peak height of the sample from Comparative Example 3 being taken as 100%. Table 1 also shows the ratio of the number of moles of titanium (Ti molar ratio (mol %)) relative to the total number of moles of titanium and niobium, and the ratio of the total number of moles of titanium and niobium (Ti+Nb molar ratio (mol %)) relative to the total number of moles of metals excluding lithium.

TABLE 1

| Sample | Ti molar ratio (mol %) | Ti + Nb molar ratio (mol %) | Relative peak height (%) |
|---|---|---|---|
| C1 | 0 | 1.5 | 81 |
| E1 | 10 | 1.5 | 71 |
| E2 | 30 | 1.5 | 60 |
| E3 | 50 | 1.5 | 39 |
| E4 | 70 | 1.5 | 39 |
| E5 | 90 | 1.5 | 58 |
| C2 | 100 | 1.5 | 79 |
| C3 | — | — | 100 |
| E6 | 50 | 0.5 | 58 |
| E7 | 50 | 1.0 | 39 |

Positive electrode samples containing a lithium transition metal complex oxide that contains titanium and niobium in the chemical composition emits less desorbed oxygen gas, and is more stable. Less generation of desorbed oxygen gas contributes to increased safety of a non-aqueous electrolyte secondary battery including the positive electrode.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive electrode active material for a non-aqueous electrolyte secondary battery, the positive electrode active material comprising:
    a layer-structured, nickel-containing lithium transition metal complex oxide,
    the lithium transition metal complex oxide containing titanium and niobium in a chemical composition thereof, and having a ratio of a total number of moles of titanium and niobium relative to a total number of moles of metals excluding lithium in the chemical composition of more than zero and 0.04 or less,
    wherein the lithium transition metal complex oxide further comprises manganese, and
    wherein a ratio of a number of moles of manganese relative to the total number of moles of metals excluding lithium is more than 0.1 and 0.45 or less.

2. The positive electrode active material for a non-aqueous electrolyte secondary battery according to claim 1, wherein the lithium transition metal complex oxide has a ratio of a number of moles of titanium relative to the total number of moles of titanium and niobium in the chemical composition of 0.05 to 0.95.

3. The positive electrode active material for a non-aqueous electrolyte secondary battery according to claim 1, wherein the lithium transition metal complex oxide has a ratio of a number of moles of nickel relative to the total number of moles of metals excluding lithium in the chemical composition of 0.3 or more and less than 1.

4. The positive electrode active material for a non-aqueous electrolyte secondary battery according to claim 2, wherein the lithium transition metal complex oxide has a ratio of a number of moles of nickel relative to the total number of moles of metals excluding lithium in the chemical composition of 0.3 or more and less than 1.

5. The positive electrode active material for a non-aqueous electrolyte secondary battery according to claim 1, wherein the lithium transition metal complex oxide further contains cobalt, and has a ratio of a number of moles of cobalt relative to the total number of moles of metals excluding lithium in the chemical composition of 0.05 or more and less than 1.

6. The positive electrode active material for a non-aqueous electrolyte secondary battery according to claim 2, wherein the lithium transition metal complex oxide further contains cobalt, and has a ratio of a number of moles of cobalt relative to the total number of moles of metals excluding lithium in the chemical composition of 0.05 or more and less than 1.

7. The positive electrode active material for a non-aqueous electrolyte secondary battery according to claim 3, wherein the lithium transition metal complex oxide further contains cobalt, and has a ratio of a number of moles of cobalt relative to the total number of moles of metals excluding lithium in the chemical composition of 0.05 or more and less than 1.

8. The positive electrode active material for a non-aqueous electrolyte secondary battery according to claim 4, wherein the lithium transition metal complex oxide further contains cobalt, and has a ratio of a number of moles of cobalt relative to the total number of moles of metals excluding lithium in the chemical composition of 0.05 or more and less than 1.

9. The positive electrode active material for a non-aqueous electrolyte secondary battery according to claim 1, wherein the lithium transition metal complex oxide has a composition represented by formula below:

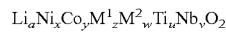

$$Li_aNi_xCo_yM^1_zM^2_wTi_uNb_vO_2$$

wherein $0.95 \leq a \leq 1.5$, $0.3 \leq x < 1$, $0 \leq y < 1$, $0.1 < z \leq 0.45$, $0 \leq w \leq 0.05$, $0 < u \leq 0.02$, $0 < v \leq 0.02$, $x+y+z+w+u+v \leq 1$, $0 < u+v \leq 0.04$ are satisfied; $M^1$ contains Mn; and $M^2$ is at least one selected from Mg, Zr, W, Ta, and Mo.

10. The positive electrode active material for a non-aqueous electrolyte secondary battery according to claim 2, wherein the lithium transition metal complex oxide has a composition represented by formula below:

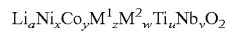

$$Li_aNi_xCo_yM^1_zM^2_wTi_uNb_vO_2$$

wherein $0.95 \leq a \leq 1.5$, $0.3 \leq x < 1$, $0 \leq y < 1$, $0.1 < z \leq 0.45$, $0 \leq w \leq 0.05$, $0 < u \leq 0.02$, $0 < v \leq 0.02$, $x+y+z+w+u+v \leq 1$, $0 < u+v \leq 0.04$ are satisfied; $M^1$ contains Mn; and $M^2$ is at least one selected from Mg, Zr, W, Ta, and Mo.

11. The positive electrode active material for a non-aqueous electrolyte secondary battery according to claim 3, wherein the lithium transition metal complex oxide has a composition represented by formula below:

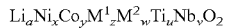

wherein $0.95 \leq a \leq 1.5$, $0.3 \leq x < 1$, $0 \leq y < 1$, $0.1 < z \leq 0.45$, $0 \leq w \leq 0.05$, $0 < u \leq 0.02$, $0 < v \leq 0.02$, $x+y+z+w+u+v \leq 1$, $0 < u+v \leq 0.04$ are satisfied; $M^1$ contains Mn; and $M^2$ is at least one selected from Mg, Zr, W, Ta, and Mo.

12. The positive electrode active material for a non-aqueous electrolyte secondary battery according to claim 4, wherein the lithium transition metal complex oxide has a composition represented by formula below:

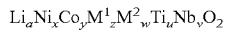

wherein $0.95 \leq a \leq 1.5$, $0.3 \leq x < 1$, $0 \leq y < 1$, $0.1 < z \leq 0.45$, $0 \leq w \leq 0.05$, $0 < u \leq 0.02$, $0 < v \leq 0.02$, $x+y+z+w+u+v \leq 1$, $0 < u+v \leq 0.04$ are satisfied; $M^1$ contains Mn; and $M^2$ is at least one selected from Mg, Zr, W, Ta, and Mo.

13. The positive electrode active material for a non-aqueous electrolyte secondary battery according to claim 1, wherein titanium and niobium are not locally present on a surface of the lithium transition metal complex oxide.

14. The positive electrode active material for a non-aqueous electrolyte secondary battery according to claim 1, wherein a ratio of a number of moles of niobium relative to the total number of moles of metals excluding lithium is more than zero and 0.008 or less.

15. The positive electrode active material for a non-aqueous electrolyte secondary battery according to claim 1, wherein the ratio of the total number of moles of titanium and niobium relative to the total number of moles of metals excluding lithium is more than zero and 0.016 or less.

16. The positive electrode active material for a non-aqueous electrolyte secondary battery according to claim 9, wherein $M^1$ contains Mn and Al.

17. The positive electrode active material for a non-aqueous electrolyte secondary battery according to claim 10, wherein $M^1$ contains Mn and Al.

18. The positive electrode active material for a non-aqueous electrolyte secondary battery according to claim 11, wherein $M^1$ contains Mn and Al.

19. The positive electrode active material for a non-aqueous electrolyte secondary battery according to claim 12, wherein $M^1$ contains Mn and Al.

20. A non-aqueous electrolyte secondary battery including a positive electrode containing the positive electrode active material according to claim 1.

21. A method of producing a positive electrode active material for a non-aqueous electrolyte secondary battery according to claim 1, the method comprising:
preparing a raw material mixture containing a nickel-containing compound, a lithium-containing compound, a titanium-containing compound, and a niobium-containing compound, and heat-treating the raw material mixture.

* * * * *